United States Patent [19]

Davis et al.

[11] 4,377,831
[45] Mar. 22, 1983

[54] NON-ABRASIVE MAGNETIC HEAD CLEANING SYSTEM

[75] Inventors: C. Paul Davis, Woodland Hills; Joseph Sandor, Reseda, both of Calif.

[73] Assignee: Innovative Computer Products Corp., Tarzana, Calif.

[21] Appl. No.: 234,576

[22] Filed: Feb. 13, 1981

Related U.S. Application Data

[63] Continuation of Ser. No. 20,808, Mar. 15, 1979, abandoned.

[51] Int. Cl.³ .............................................. G11B 5/41
[52] U.S. Cl. .................................................. 360/128
[58] Field of Search ............................... 360/128, 133

[56] References Cited

U.S. PATENT DOCUMENTS 4,065,798 12/1977 Sugisaki et al. ..................... 360/128
4,106,067 8/1978 Masuyama et al. .................. 360/128

FOREIGN PATENT DOCUMENTS 2301533 8/1974 Fed. Rep. of Germany ...... 360/128

Primary Examiner—Robert S. Tupper
Attorney, Agent, or Firm—Spensley, Horn, Jubas & Lubitz

[57] ABSTRACT

Disclosed is a cleaning system for flexible disk equipment or the like. The system includes a cleaning disk made of an absorbent and porous fibrous material which has an area substantially saturated with a liquid cleaning solution. The cleaning disk is rotatably supported within a flat jacket. The jacket includes opposed openings on either side so as to expose a portion of the cleaning disk to enable the disk to come into contact with a magnetic head or heads and its associated pressure pad if one is used. At least one of the openings is enlarged to expose a relatively large portion of the surface of the cleaning disk, so as to facilitate complete saturation of an area of the cleaning disk with a liquid cleaning solution while leaving a portion of the cleaning disk dry. The jacket containing the disk is placed within a flexible disk system which rotates the saturated disk, thus causing the magnetic head(s) and the pressure pad to be cleaned in a non-abrasive fashion with a wet, dry, wet action.

17 Claims, 2 Drawing Figures

NON-ABRASIVE MAGNETIC HEAD CLEANING SYSTEM

BACKGROUND OF THE INVENTION

This is a continuation, of application Ser. No. 20,808, filed Mar. 15, 1979, now abandoned.

1. Field of the Invention

This invention relates to systems for cleaning the magnetic heads and pressure pads in flexible disk systems. With flexible disk drives, as with other pieces of data processing equipment, preventive care and periodic maintenance are necessary to insure efficient, smooth and error free operation. Unlike other peripheral devices, the magnetic heads and pressure pads on flexible disk drives are extremely difficult to access without partially disassembling the drive system. Due to this difficulty, head cleaning is done only when read/write problems are being experienced.

2. Prior Art

Several systems have been developed in an attempt to provide a convenient means of cleaning the heads and flexible disk systems. One such system utilizes two flexible disk jackets. One of the jackets contains an abrasive lapping material, and the other contains a cleaning cloth material. The first jacket is inserted into the flexible disk system and run through the machine for a predetermined amount of time (generally no longer than ten seconds in order to avoid damage to the magnetic head from the abrasive material) so as to loosen debris from the head. The second jacket is then run through the machine so as to pick up the loosened debris. The flexible disk jackets which are used contain standard size openings (i.e. thin radial slots) in order to allow the heads and pressure pad to contact the cleaning material.

A second system, described in IBM Technical Disclosure Bulletin Vol. 20, No. 8, January 1978, utilizes a standard flexible disk jacket and substitutes an abrasive disk for the normal magnetic disk. The abrasive disk is coated with either chromic oxide ($CR_2O_3$) having a diameter of less than 0.7 microns or aluminum oxide ($Al_2O_3$) of the same diameter. The assembly is used to initially lap the magnetic heads of disk drive machines and subsequently remove contaminant build-up on the heads.

A third system for cleaning magnetic heads is disclosed in U.S. Pat. No. 4,065,798 issued to Sugisaki, et al., on Dec. 27, 1977. This system includes a cleaning disk which has a flexible non-magnetic support (e.g., polyvinyl chloride) coated with a magnetic layer on one side and a fibrous cleaning material on the other side. The cleaning disk is located within a cartridge which contains a lubricating layer facing the magnetic layer of the cleaning disk, and includes a normal radial slit which allows the magnetic head to contact the fibrous cleaning material.

It is therefore an object of this invention to provide a system for cleaning the magnetic heads and pressure pads of flexible disk drive machines without the need for any disassembly of the machine.

It is another object of the present invention to provide a head cleaning system which is substantially non-abrasive and will therefore not harm the magnetic heads in any way.

It is another object of the invention to provide a head cleaning system which permits the use of a liquid cleaning solution.

It is a further object of the invention to provide a head cleaning system which may be left engaged in a disk drive machine for long periods of time without damage to the magnetic heads.

SUMMARY OF THE INVENTION

These and other objects are achieved by providing a head cleaning system which incudes a cleaning disk made of an absorbent lint free and porous material which has an area substantially saturated with a liquid cleaning solution and a dry area. The cleaning disk is rotatably supported within a jacket that includes opposed radial openings on its upper and lower surfaces for exposing the cleaning disk to the magnetic head and pressure pad of a flexible disk system (or both sets of magnetic heads if the drive system is equipped for dual sided flexible disks). At least one of the openings exposes enough of the surface of the cleaning disk so as to facilitate saturation of approximately $\frac{1}{8}$ to $\frac{1}{2}$ of the cleaning disk area with the cleaning solution without requiring removal of the disk from the jacket. As the disk rotates a wet/dry/wet/dry surface is presented to the head(s) which provides an effective non-abrasive cleaning. Also, the formulation of the solution is such that it evaporates during the predetermined cleaning cycle insuring that the head(s) are dry and clean. The porous nature of the cleaning disk facilitates the collection of foreign particles.

BRIEF DESCRIPTION OF THE DRAWINGS

In the drawings, wherein like numerals refer to corresponding components in the several Figures.

DETAILED DESCRIPTION OF THE DRAWINGS

Figure 1:
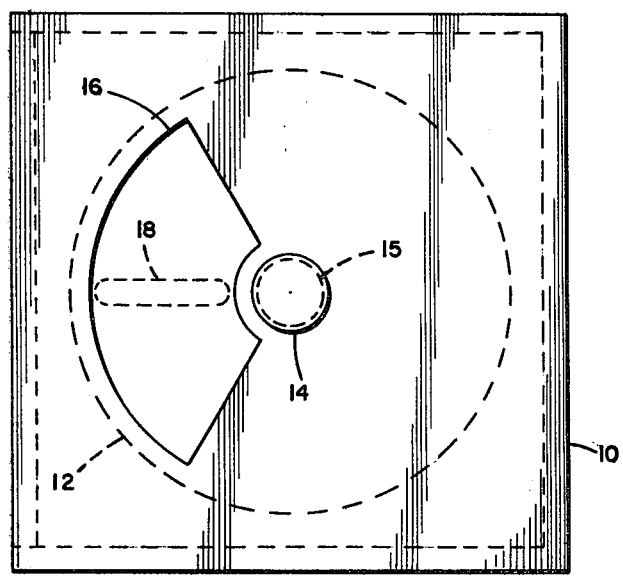
FIG. 1 is a top plan view of the cleaning system of the present invention.

Referring now to FIG. 1, the present invention includes a jacket 10 which rotatably supports a cleaning disk 12. The material used for the jacket 10 is not critical and may conveniently be the standard black vinyl-like or paper-like material which is utilized for normal magnetic floppy disk jackets. The cleaning disk 12 is made of a lint-free, absorbent material of a porous nature so that contaminants and debris picked up from the head(s) are trapped and held by the cleaning disk surface. Preferably, the disk 12 is made from a fibrous material having a white or other light color material so that an operator may easily tell when the disk 12 needs replacement by checking it for discoloration. The cleaning disk 12 should be relatively resistant to wear so that frequent replacement is not necessary. Materials which may be used for the cleaning disc 12 include spunbonded polyester (e.g., Dupont Reemay) or spunbonded olefin (e.g., Dupont Tyvek).

Referring further to FIG. 1, the jacket 10 includes a center opening 14 for accommodating a drive shaft of a disk drive system. Similarly, the cleaning disk 12 includes a center opening 15 through which a drive shaft passes. The jacket 10 includes an enlarged radial opening 16 which exposes a sector of the cleaning disk 12 in the range of approximately 45°–180° (i.e., $\frac{1}{8}$–$\frac{1}{2}$ of the cleaning area of the cleaning disk) and preferably approximately 120°. The opposite side of the jacket 10 contains a normal thin radial slit opening 18. The openings 16 and 18 serve to expose the surface of the cleaning disk to a magnetic head and pressure pad of a disk drive system, or to two magnetic heads in the case of a dual sided disk drive system. The enlarged opening 16 is provided to facilitate saturation of the cleaning disk 12 with a cleaning fluid in one application without requiring the removal of the cleaning disk 12 from the jacket 10 or rotation of the disk 12. Depending upon the absorbency and wetting action of the material of the cleaning disk 12, the size of the opening 16 may be either smaller or larger than the 120° shown. Generally, with the aforementioned materials the opening will be sufficient if it exposes approximately one quarter of the surface of the cleaning disk 12 (i.e., the opening 16 covers a 90° sector). The basic purpose is to permit the application of cleaning fluid through the opening 16 which will then be absorbed by the cleaning disk 12 over the appropriate portion of its surface. If the jacket 10 contained thin radial slots which are normally used for magnetic disk jackets, (i.e., approximately the size of the opening 18), it would be difficult if not impossible to properly saturate the cleaning disk 12 in one application. Rather, a small portion of the disk 12 would have to be saturated and then the disk 12 would have to be rotated so as to expose another unsaturated portion. This process would have to be continued until the appropriate portion of the cleaning disk 12 were saturated with cleaning fluid. When a volatile cleaning solution is employed such as one employing freon and isprophyl alcohol there is the problem of the solution quickly evaporating before cleaning commences. Since the material used for the disk 12 is absorbent, the 120° opening 16 permits quick saturation in one application while still allowing the jacket 10 to support the disk 12.

Many types of cleaning solutions may be used to saturate the disk 12. For example, a typical isopropyl alcohol or a mixture of isopropyl alcohol and a flourocarbon (e.g., freon) could be utilized. Any solution may be employed that: has solvent properties such that it dissolves common contaminants found on heads, does not leave a residue on the heads, and evaporates during the predetermined cleaning cycle (e.g., less than three minutes). In the preferred embodiment the cleaning solution evaporates in less than 90 seconds when rotated by a commercially available floppy disk drive.

Figure 2:
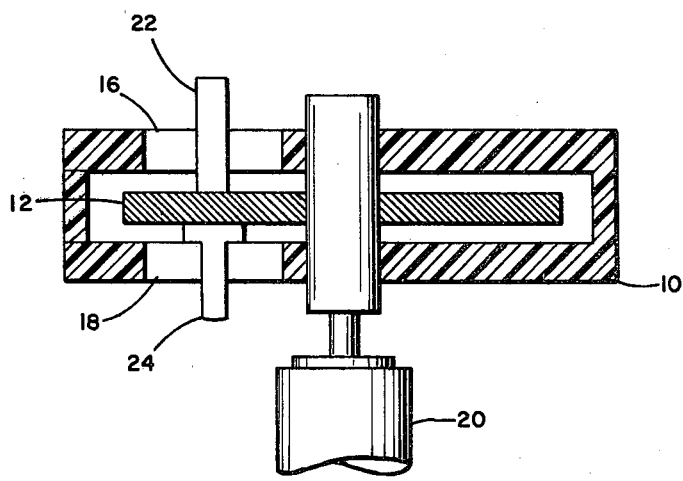
FIG. 2 is a side view, in section, of the cleaning system of the present invention shown in position to clean the magnetic head and pressure pad of a disk drive system.

Referring now to FIG. 2, the cleaning jacket 10 with the cleaning disk 12 is shown in engagement with a drive system 20. After a portion of the cleaning disk is saturated with cleaning solution via opening 16 a magnetic head 22 contacts one side of the cleaning disk 12 via opening 16 and a pressure pad 24 contacts the other side of the disk 12. In the case of a dual sided magnetic disk system, a second magnetic head would replace the pressure pad 24. The drive system 20 rotates the cleaning disk 12. Debris which has accumulated on the magnetic head 22 and the pressure pad 24 is dissolved by the cleaning solution and carried away by the cleaning disk 12. The dry portion of the cleaning disk contacts the head after the wet portion of the cleaning disk contacts the head(s). This wet-dry cycle facilitates drying and cleaning of the heads. Since the fibrous material of the disk 12 is substantially non-abrasive, the drive system 20 may be left engaged for a long period of time without any damage to the magnetic head 22.

In summary, the present invention provides a system which permits convenient one-step cleaning of the magnetic heads and pressure pads on magnetic disk drive systems. This is facilitated by using a jacket having an enlarged opening and carrying a cleaning disk of fibrous and porous absorbent material. A cleaning solution is applied to the cleaning disk through the enlarged opening until a portion of the cleaning disk is saturated. The jacket containing the disk is then placed within a disk drive system which is then turned on for a period of time so as to clean the magnetic heads and pressure pads of the system.

I claim:

1. A system for cleaning magnetic heads in flexible disk systems, comprising:
    a cleaning disk made of an absorbent and porous material, and adapted to be saturated with a liquid cleaning fluid; and
    a flat jacket rotatably supporting said cleaning disk within its interior, said jacket including at least one opening for exposing said cleaning disk to the magnetic head of a flexible disk system, said opening exposing at least one eighth of the surface of said cleaning disk so as to facilitate saturation of the appropriate area of said cleaning disk with cleaning fluid without requiring removal of said disk from said jacket.

2. The system of claim 1 wherein said cleaning disk has a cleaning solution applied thereto via said opening.

3. The system of claim 2 wherein said cleaning solution comprises isopropyl alcohol.

4. The system of claim 2 wherein said cleaning solution comprises a mixture of freon and isopropyl alcohol.

5. The system of claim 1 wherein said absorbent material is a light color, lint free and fibrous material.

6. The system of claim 1 wherein said opening exposes at least one-quarter of the surface of said cleaning disk and said jacket includes a smaller second opening in opposed position to said first opening.

7. The system of claim 1 wherein said opening exposes a sector of said cleaning disk of approximately 120°.

8. A magnetic head and pressure pad cleaning system for flexible disk systems comprising:
    a cleaning disk made of an absorbent, fibrous material; and
    a flat jacket for rotatably supporting said cleaning disk within its interior, said jacket including one or more radial openings for exposing said cleaning disk to the magnetic heads and pressure pads of flexible disk systems, said one or more openings exposing a portion of the surface of the cleaning disk to facilitate saturation of said portion of the cleaning disk with a cleaning fluid without requiring removal of the cleaning disk from the jacket.

9. The system of claim 8 wherein at least one of said openings exposes a sector of said cleaning disk of approximately 120°.

10. The system of claim 8 wherein the cleaning disk is white.

11. A method for cleaning magnetic heads in a disk system employing a jacket that rotatably supports a cleaning disk within its interior and has an opening therein which exposes a portion of the cleaning disk to facilitate saturation of said portion of the cleaning disk with a cleaning solution; the steps comprising:
    saturating a portion of said cleaning disk with a cleaning solution applied via said opening;
    bringing said cleaning disk into contact with said magnetic head to be cleaned; and rotating said cleaning disk to alternately contact said head with a wet portion and a dry portion of said cleaning disk.

12. The method defined in claim 11 wherein the cleaning solution employed evaporates in less than three minutes when the cleaning disk is rotated.

13. The method defined in claim 11 wherein the material employed for the cleaning disk is an absorbent and porous material; said porous nature of the material enabling foreign particles to be collected by said cleaning disk.

14. The method defined in claim 11 wherein between $\frac{1}{8}$ to $\frac{1}{2}$ of the cleaning area of the cleaning disk is saturated with cleaning solution.

15. A system for cleaning magnetic heads in flexible disk systems, comprising:
 a single layer cleaning disk made of an absorbent, porous and substantially non-abrasive material, and adapted to be saturated with a liquid cleaning fluid; and
 a flat jacket supporting said cleaning disk for rotation within the interior of the jacket, said jacket including at least one opening for exposing said cleaning disk to the magnetic head of a flexible disk system, said opening facilitating saturation of a portion of said cleaning disk with cleaning fluid without requiring removal of said disk from said jacket, said disk thereby having alternating wet and dry portions which clean the magnetic head or heads as the cleaning disk is rotated within the jacket.

16. A system for cleaning magnetic heads in flexible disk systems, comprising:
 a cleaning disk made of an absorbent and porous material, and adapted to be saturated with a liquid cleaning fluid; and
 a flat jacket rotatably supporting said cleaning disk within its interior, said jacket including one or more openings, said one or more openings exposing a total of at least one eighth of the surface of said cleaning disk so as to facilitate saturation of a predetermined portion of said cleaning disk with cleaning fluid without requiring removal of said disk from said jacket.

17. A system for cleaning magnetic heads in flexible disk systems, comprising:
 a cleaning disk made of an absorbent and porous material, and adapted to be saturated with a liquid cleaning fluid;
 a flat jacket rotatably supporting said cleaning disk within its interior, said jacket including one or more openings, wherein one of the openings exposes the cleaning disk to a magnetic head in a disk system, at least one of the openings exposing a portion of the surface of said cleaning disk so as to facilitate saturation of a predetermined portion of said cleaning disk with cleaning fluid without requiring removal of said disk from said jacket; and
 a cleaning fluid for application to the cleaning disk, whereby the magnetic head is cleaned with an alternating wet/dry/wet/dry action.

* * * * *

UNITED STATES PATENT AND TRADEMARK OFFICE
CERTIFICATE OF CORRECTION

PATENT NO. : 4,377,831
DATED      : March 22, 1983
INVENTOR(S): C. Paul Davis, et al It is certified that error appears in the above-identified patent and that said Letters Patent is hereby corrected as shown below:

Claims 8-17 should be deleted.
On the title page "17 Claims" should read --7 Claims--.

Signed and Sealed this

Twenty-seventh Day of December 1983

[SEAL]

Attest:

GERALD J. MOSSINGHOFF

Attesting Officer    Commissioner of Patents and Trademarks